US011256343B2

(12) United States Patent
Hsu

(10) Patent No.: US 11,256,343 B2
(45) Date of Patent: Feb. 22, 2022

(54) ELECTROMAGNETIC INDUCTION TYPE COORDINATE POSITIONING APPARATUS

(71) Applicant: Shenzhen Pu Ying Innovation Technology Corp., LTD., Shenzhen (CN)

(72) Inventor: Chung-Wen Hsu, Shenzhen (CN)

(73) Assignee: Shenzhen Pu Ying Innovation Technology Corp., LTD., Shenzhen (CN)

( * ) Notice: Subject to any disclaimer, the term of this patent is extended or adjusted under 35 U.S.C. 154(b) by 0 days.

(21) Appl. No.: 17/116,981

(22) Filed: Dec. 9, 2020

(65) Prior Publication Data

US 2021/0294440 A1 Sep. 23, 2021

(30) Foreign Application Priority Data

Mar. 23, 2020 (CN) ........................ 202010208662.3

(51) Int. Cl.

*G06F 3/03* (2006.01)
*G06F 3/0354* (2013.01)
*H02J 50/90* (2016.01)
*H02J 50/10* (2016.01)
*G06F 3/046* (2006.01)

(52) U.S. Cl.

CPC .......... *G06F 3/03545* (2013.01); *G06F 3/046* (2013.01); *H02J 50/10* (2016.02); *H02J 50/90* (2016.02)

(58) Field of Classification Search

CPC ...... G06F 3/03545; G06F 3/046; H02J 50/10; H02J 50/90

See application file for complete search history.

(56) References Cited

U.S. PATENT DOCUMENTS

2017/0153748 A1* 6/2017 Choi .................... G06F 3/0446

FOREIGN PATENT DOCUMENTS

| | | | |
|---|---|---|---|
| JP | H064203 | A | 1/1994 |
| JP | H09305293 | A | 11/1997 |

* cited by examiner

*Primary Examiner* — Lisa S Landis

(57) ABSTRACT

An electromagnetic induction type coordinate positioning apparatus is provided. The apparatus includes a first induction coil, a second induction coil, a trigger circuit, and a control circuit. The first induction coil is flowed through a first current signal, and the first induction coil is configured to sense a pointer device when the electromagnetic induction type coordinate positioning apparatus is in a sleep mode, and generate a first induction signal when detecting the pointer device. The second induction coil is flowed through a second current signal, and the first induction coil is configured to sense and communicate with the pointer device when in an operating mode. The trigger circuit sends an interrupt signal according to the first induction signal. The control circuit interrupts the sleep mode according to the interrupt signal and switches to the operating mode. The control circuit in the operating mode controls the second control signal to flow through the second induction coil.

10 Claims, 5 Drawing Sheets

ELECTROMAGNETIC INDUCTION TYPE COORDINATE POSITIONING APPARATUS

CROSS-REFERENCE TO RELATED APPLICATION

This non-provisional application claims priority under 35 U.S.C. § 119(a) to Patent Application No. 202010208662.3 filed in China, P.R.C. on Mar. 23, 2020, the entire contents of which are hereby incorporated by reference.

BACKGROUND

Technical Field

The present disclosure relates to an electromagnetic induction type coordinate positioning apparatus.

Related Art

Generally speaking, an electromagnetic induction type coordinate positioning apparatus wakes up from the sleep mode only after the user presses the power button, and only after the electromagnetic induction type coordinate positioning apparatus is woken up, can the user write on it by operating a pointer device. However, when the user forgets to press the power button to wake up the electromagnetic induction type coordinate positioning apparatus, the electromagnetic induction type coordinate positioning apparatus is in the sleep mode and does not record what the user writes. Therefore, when the user finds that the electromagnetic induction type coordinate positioning apparatus does not recorded the content that has been written, the user needs to press the power button to wake up the electromagnetic induction type coordinate positioning apparatus, and then starts writing after the electromagnetic induction type coordinate positioning apparatus is woken up, causing inconvenience in use to the user.

SUMMARY

An objective of the present disclosure is to provide an electromagnetic induction type coordinate positioning apparatus which can automatically switch from a sleep mode to an operating mode when a pointer device is in proximity.

In some embodiments, an electromagnetic induction type coordinate positioning apparatus operated with a pointer device is provided, including a first induction coil, a second induction coil, a trigger circuit, and a control circuit. The first induction coil is flowed through a first current signal, and the first induction coil is configured to sense the pointer device when the electromagnetic induction type coordinate positioning apparatus is in a sleep mode, and generate a first induction signal when detecting the pointer device. The second induction coil is flowed through a second current signal, and the second induction coil is configured to sense and communicate with the pointer device when the electromagnetic induction type coordinate positioning apparatus is in an operating mode. The trigger circuit is electrically-coupled to the first induction coil, and configured to receive the first induction signal, and sends an interrupt signal according to the first induction signal. The control circuit is electrically-coupled to the second induction coil and the trigger circuit, and is configured to receive the interrupt signal in the sleep mode. The control circuit interrupts the sleep mode according to the interrupt signal and switches to the operating mode. The control circuit in the operating mode controls the second control signal to flow through the second induction coil.

The present disclosure is described in detail below with reference to the accompanying drawings and specific embodiments, but the descriptions are not intended to limit the present disclosure.

DETAILED DESCRIPTION

Figure 1:
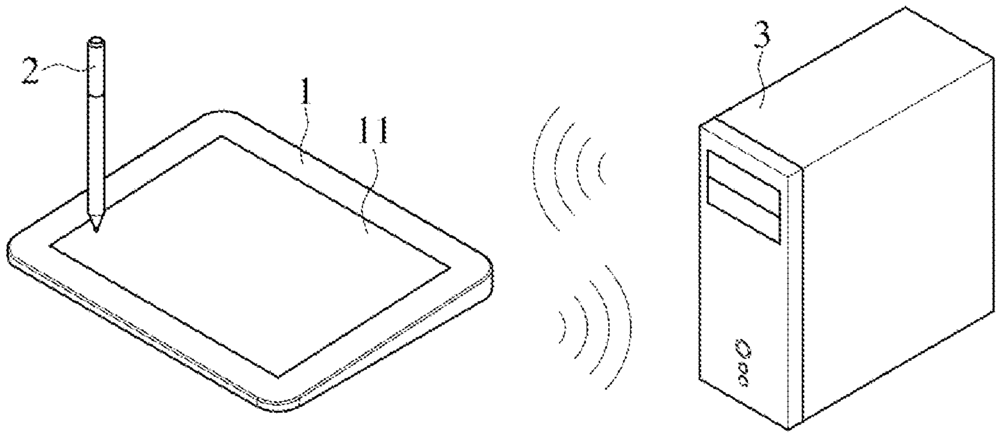
FIG. 1 is a diagram of an embodiment of an electromagnetic induction type coordinate positioning apparatus and a pointer device applicable to the electromagnetic induction type coordinate positioning apparatus.
Figure 2:
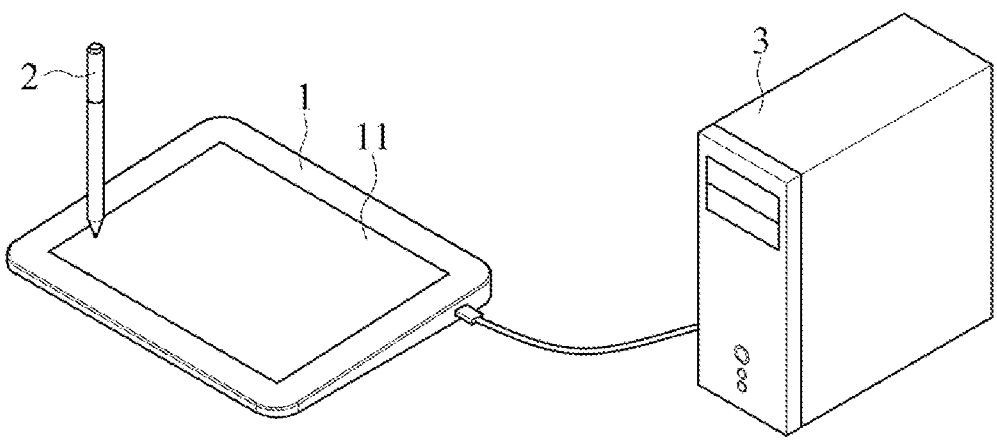
FIG. 2 is a diagram of another embodiment of an electromagnetic induction type coordinate positioning apparatus and a pointer device applicable to the electromagnetic induction type coordinate positioning apparatus.

The structural principle and the working principle are described in detail below with reference to the accompanying drawings:

Referring to FIG. 1 and FIG. 2, FIG. 1 and FIG. 2 are each a schematic diagram of an embodiment of an electromagnetic induction type coordinate positioning apparatus 1 and a pointer device 2 applicable to the electromagnetic induction type coordinate positioning apparatus 1; The electromagnetic induction type coordinate positioning apparatus 1 includes a working area 11. The pointer device 2 may or may not contact with the working area 11 of the electromagnetic induction type coordinate positioning apparatus 1. There are two working mode of the electromagnetic induction type coordinate positioning apparatus 1 which are low power consumption sleep mode and full function operating mode. When the position of the pointer device 2 is put around the working area 11, and the electromagnetic induction type coordinate positioning apparatus 1 detects the pointer device 2, the electromagnetic induction type coordinate positioning apparatus 1 is woken up from the sleep mode and enters the operating mode to communicate with the pointer device 2. In addition, as shown in FIG. 1 and FIG. 2, the electromagnetic induction type coordinate positioning apparatus 1 may communicate with another electronic device 3 bidirectionally in a wired or wireless manner. The electromagnetic induction type coordinate positioning apparatus 1 may be a writing tablet, a tablet computer, or a smart notebook. The pointer device 2 may be an electromagnetic induction type stylus. The electronic device 3 may be a mobile phone, a tablet computer, or a notebook computer.

Figure 3:
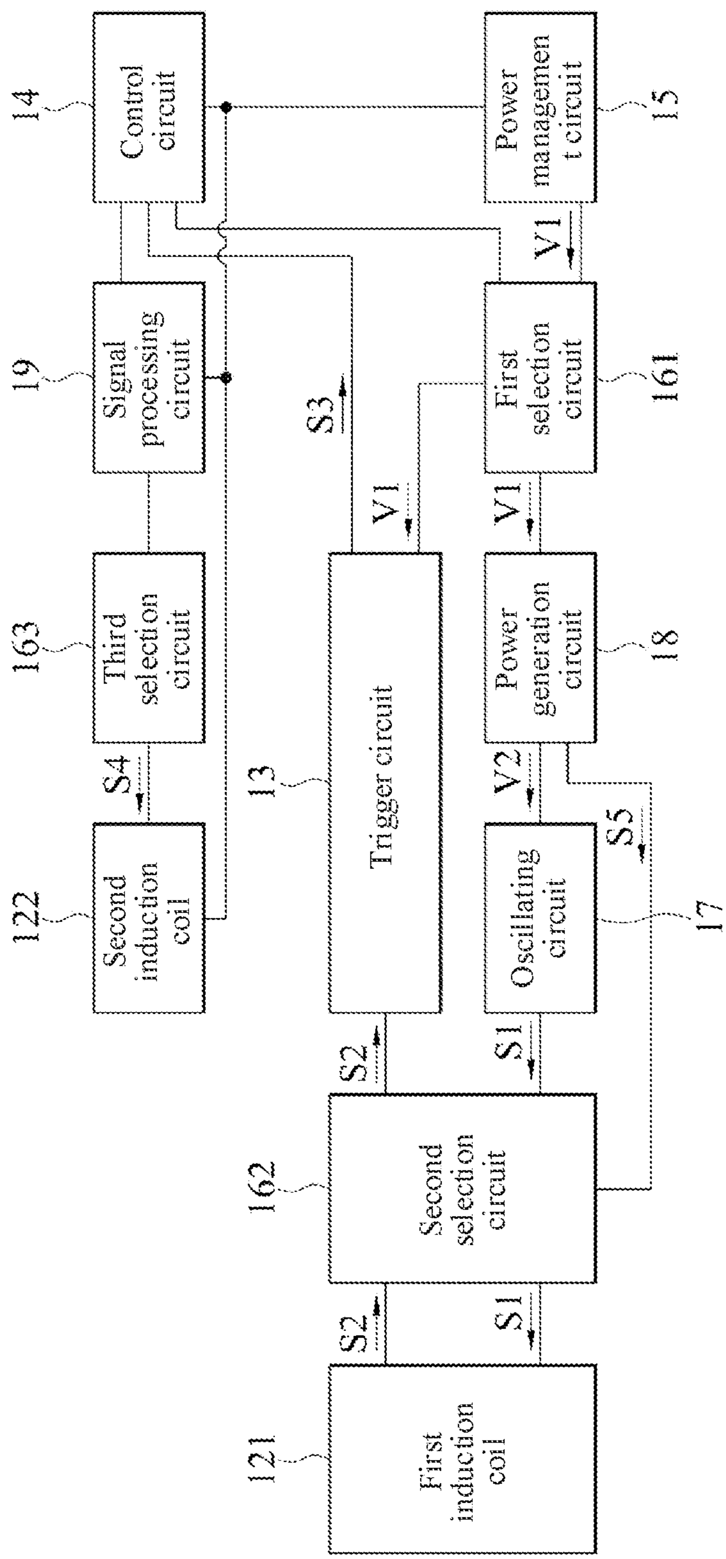
FIG. 3 is a diagram of an embodiment of an electromagnetic induction type coordinate positioning apparatus.

Referring to FIG. 3, FIG. 3 is a diagram of an embodiment of an electromagnetic induction type coordinate positioning apparatus 1. The electromagnetic induction type coordinate positioning apparatus 1 includes a plurality of induction coils (hereinafter referred to as a first induction coil 121 and a second induction coil 122 for the convenience of description), a trigger circuit 13, and a control circuit 14. The trigger circuit 13 is electrically-coupled to the first induction coil 121. The control circuit 14 is electrically-coupled to the second induction coil 122 and the trigger circuit 13.

The control circuit 14 includes a sleep mode and an operating mode. When the control circuit 14 is in the sleep mode, a first current signal S1 is generated with the first induction coil 121, and the first induction coil 121 generates an excitation magnetic field according to the first current signal S1 to sense the pointer device 2. When the pointer device 2 is proximity of the first induction coil 121, the first induction coil 121 generates a first induction signal S2 and transfers the first induction signal S2 to the trigger circuit 13. The trigger circuit 13 generates an interrupt signal S3 to the control circuit 14 according to the received first induction signal S2, to trigger waking up of the control circuit 14. After the control circuit 14 receives the interrupt signal S3 in the sleep mode, the control circuit 14 exits from the sleep mode and switches to the operating mode. After the control circuit 14 enters the operating mode, a second current signal S4 is generated between the control circuit 14 and the second induction coil 122, the control circuit 14 controls the second current signal S4 to flow through the second induction coil 122, and the second induction coil 122 generates an excitation magnetic field according to the second current signal S4 so that the pointer device 2 is been charged completely during this power charging procedure. The control circuit 14 may further send an instruction to the pointer device 2 with the second induction coil 122, calculate coordinate information of the pointer device 2 by using the second induction coil 122 to sense the pointer device 2, and receive, with the second induction coil 122, a response signal such as manufacturing date code or a pressure signal which is sent by the pointer device 2 in response to the instruction, thus implementing bidirectional communication between the pointer device 2 and the electromagnetic induction type coordinate positioning apparatus 1.

Based on this, when the control circuit 14 is in the sleep mode, the electromagnetic induction type coordinate positioning apparatus 1 may switch to the operating mode when the pointer device 2 is in proximity and be detected, and the user does not need to press a power button of the electromagnetic induction type coordinate positioning apparatus 1 to wake up the electromagnetic induction type coordinate positioning apparatus 1, thereby avoiding the case that the content written by using the pointer device 2 by the user on the electromagnetic induction type coordinate positioning apparatus 1 in the sleep mode is not recorded.

In some embodiments, the electromagnetic induction type coordinate positioning apparatus 1 may include a power management circuit 15 and a first selection circuit 161, the power management circuit 15 is electrically-coupled to the trigger circuit 13, and the first selection circuit 161 is electrically-coupled to the power management circuit 15, the trigger circuit 13, and the control circuit 14. The power management circuit 15 may output a power source V1. When the control circuit 14 is in the sleep mode, the first selection circuit 161 is switched on to electrically connect the power management circuit 15 and the trigger circuit 13, and the power source V1 generated by the power management circuit 15 may be provided to the trigger circuit 13 through the first selection circuit 161, to enable the trigger circuit 13 to operate and send an interrupt signal S3 according to the first induction signal S2. When the control circuit 14 is in the operating mode, the control circuit 14 controls the first selection circuit 161 to be switched off to disconnect the power management circuit 15 from the trigger circuit 13. Therefore, the power management circuit 15 stops providing the power source V1 to the trigger circuit 13, so as to disable the trigger circuit 13.

In some embodiments, the first selection circuit 161 may be a circuit triggered by a low level signal, and when the control circuit 14 is in the sleep mode, the connection between the control circuit 14 and the first selection circuit 161 may be in low level, then may enable the first selection circuit 161 naturally. When the control circuit 14 is in the operating mode, the control circuit 14 outputs a high level signal to the first selection circuit 161, then may disable the first selection circuit 161.

In some embodiments, the electromagnetic induction type coordinate positioning apparatus 1 may include an oscillating circuit 17 and a second selection circuit 162. The oscillating circuit 17 is electrically-coupled between the first induction coil 121 and the first selection circuit 161. The second selection circuit 162 is electrically-coupled to the first induction coil 121, the oscillating circuit 17, and the trigger circuit 13. When the control circuit 14 is in the sleep mode, the oscillating circuit 17 may generate a first current signal S1, and the second selection circuit 162 is electrically connected to the oscillating circuit 17 and the first induction coil 121, so that the first current signal S1 flows from the oscillating circuit 17 to the first induction coil 121 through the second selection circuit 162, and the first induction coil 121 generates a first induction signal S2 according to the first current signal S1. After the first current signal S1 flows through the first induction coil 121, the second selection circuit 162 disconnects the oscillating circuit 17 from the first induction coil 121, and switches to electrically connect the first induction coil 121 to the trigger circuit 13, so that the first induction signal S2 generated by the first induction coil 121 is transferred from the first induction coil 121 to the trigger circuit 13 through the second selection circuit 162, and the trigger circuit 13 sends an interrupt signal S3 to the control circuit 14 according to the first induction signal S2, to wake up the control circuit 14.

In some embodiments, the electromagnetic induction type coordinate positioning apparatus 1 may include a power generation circuit 18. The power generation circuit 18 is electrically-coupled between the oscillating circuit 17 and the first selection circuit 161. When the control circuit 14 is in the sleep mode, the first selection circuit 161 is switched on, the first selection circuit 161 electrically connects the power management circuit 15 and the power generation circuit 18, and the power source V1 generated by the power management circuit 15 may be provided to the power generation circuit 18 through the first selection circuit 161, to provide electric power required for the operation of the power generation circuit 18. The power generation circuit 18 operates according to the power source V1 to generate a power source V2 to the oscillating circuit 17, so that the oscillating circuit 17 operates to generate the first current signal S1. When the control circuit 14 is in the operating mode, the control circuit 14 controls the first selection circuit 161 to be switched off, and the first selection circuit 161 stops providing the power source V1 to the power generation circuit 18, so as to switch off the operation of the power generation circuit 18, the oscillating circuit 17, the second selection circuit 162, and the first induction coil 121.

In addition, the second selection circuit 162 is controlled by the power generation circuit 18. When the control circuit 14 is in the sleep mode, the power generation circuit 18 operates according to the power source V1 to generate a control signal S5. The power generation circuit 18 sends the control signal S5 to the second selection circuit 162, to cause the second selection circuit 162 to electrically connect the first induction coil 121 to the oscillating circuit 17, so that the first current signal S1 flows from the oscillating circuit 17 to the first induction coil 121. In addition, after the first current signal S1 flows through the first induction coil 121 for a pre-defined duration, the power generation circuit 18 sends another control signal S5 having a different logic level to the second selection circuit 162, so that the second selection circuit 162 is switched to electrically connect the trigger circuit 13 to the first induction coil 121, so that the first induction signal S2 is transferred from the first induction coil 121 to the trigger circuit 13.

Figure 4:
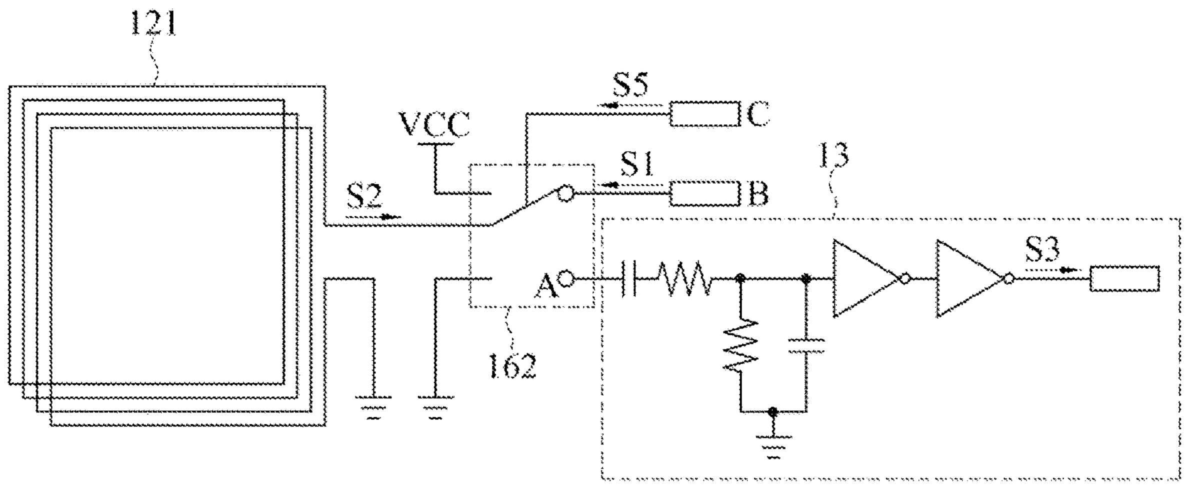
FIG. 4 is a circuit diagram of an embodiment of a first induction coil, a second selection circuit, and a trigger circuit of the electromagnetic induction type coordinate positioning apparatus of FIG. 3.
Figure 5:
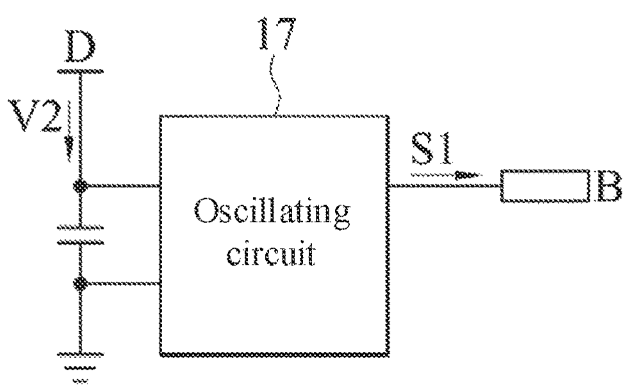
FIG. 5 is a circuit diagram of an embodiment of an oscillating circuit of the electromagnetic induction type coordinate positioning apparatus of FIG. 3.
Figure 6:
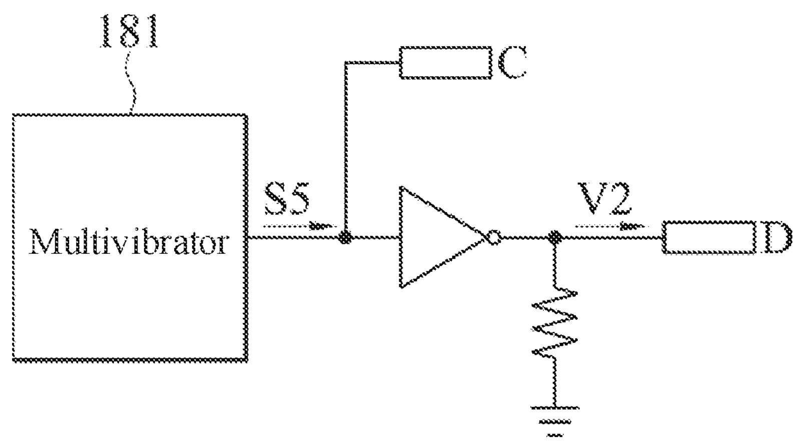
FIG. 6 is a circuit diagram of an embodiment of a power generation circuit of the electromagnetic induction type coordinate positioning apparatus of FIG. 3.

In some embodiments, referring to FIG. 4, FIG. 5, and FIG. 6, FIG. 4, FIG. 5, and FIG. 6 are respectively a circuit diagram of an embodiment of the first induction coil 121, the second selection circuit 162, the trigger circuit 13, the oscillating circuit 17, and the power generation circuit 18 of the electromagnetic induction type coordinate positioning apparatus 1 of FIG. 3. As shown in FIG. 4, the second selection circuit 162 includes a plurality of endpoints A, B, and C. One end of the second selection circuit 162 is connected to the first induction coil 121. The endpoint A is connected to the trigger circuit 13. The endpoint B is connected to an endpoint B of the oscillating circuit 17 in FIG. 5. The endpoint C is connected to an endpoint C of the power generation circuit 18. In addition, an endpoint D of FIG. 5 is connected to an endpoint D of FIG. 6.

As shown in FIG. 6, the power generation circuit 18 includes a multivibrator 181. When the control circuit 14 is in the sleep mode, the multivibrator 181 generates a power source V2 and provides same to the oscillating circuit 17 through the endpoint D, so that the oscillating circuit 17 operates according to the power source V2 to generate a first current signal S1. In addition, the control signal S5 of FIG. 6 is provided to the second selection circuit 162 shown in FIG. 4 through the endpoint C, to control the second selection circuit 162 to electrically connect to the endpoint B, so that the first current signal S1 flows from the oscillating circuit 17 through the first induction coil 121. In addition, after the first current signal S1 flows through the first induction coil 121 and the first induction coil 121 generates a first induction signal S2, the multivibrator 181 of FIG. 6 generates a control signal S5 and transfers same to the second selection circuit 162 of FIG. 4 to control the second selection circuit 162 to electrically connect to the endpoint A, so that the first induction signal S2 is transferred from the first induction coil 121 to the trigger circuit 13, and the trigger circuit 13 generates an interrupt signal S3 according to the first induction signal S2 and transfers same to the control circuit 14.

Figure 7:
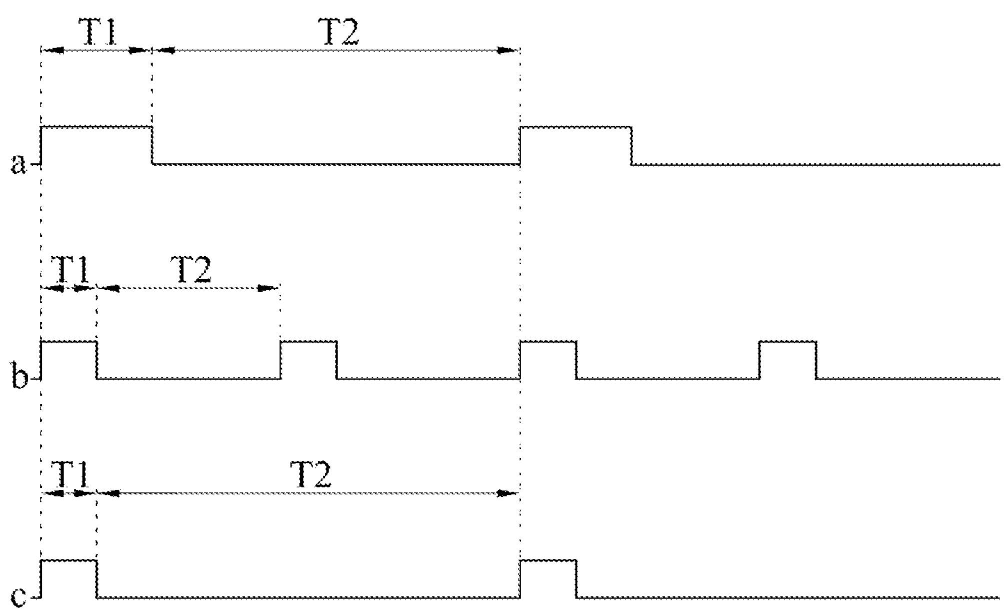
FIG. 7 is a schematic waveform diagram of an embodiment of different time intervals.

In some embodiments, referring to FIG. 7, FIG. 7 is a waveform diagram of an embodiment of different time intervals. FIG. 7 shows a plurality of waveforms a, b, and c each including a first phase duration T1 and a second phase duration T2. In the first phase duration T1, the second selection circuit 162 is electrically connected to the oscillating circuit 17. In the second phase duration T2, the second selection circuit 162 is electrically connected to the trigger circuit 13. In other words, the first induction coil 121 detects once in the first phase duration T1 whether the pointer device 2 is in proximity. When detecting that the pointer device 2 is in proximity, the first induction coil 121 in the second phase duration T2 generates a first induction signal S2 and sends the first induction signal S2 to the trigger circuit 13. The first phase duration T1 and the second phase duration T2 are adjustable. The shorter the first phase duration T1 is and the longer the second phase duration T2 is, the less the power consumed by the electromagnetic induction type coordinate positioning apparatus 1 will be.

Figure 8:
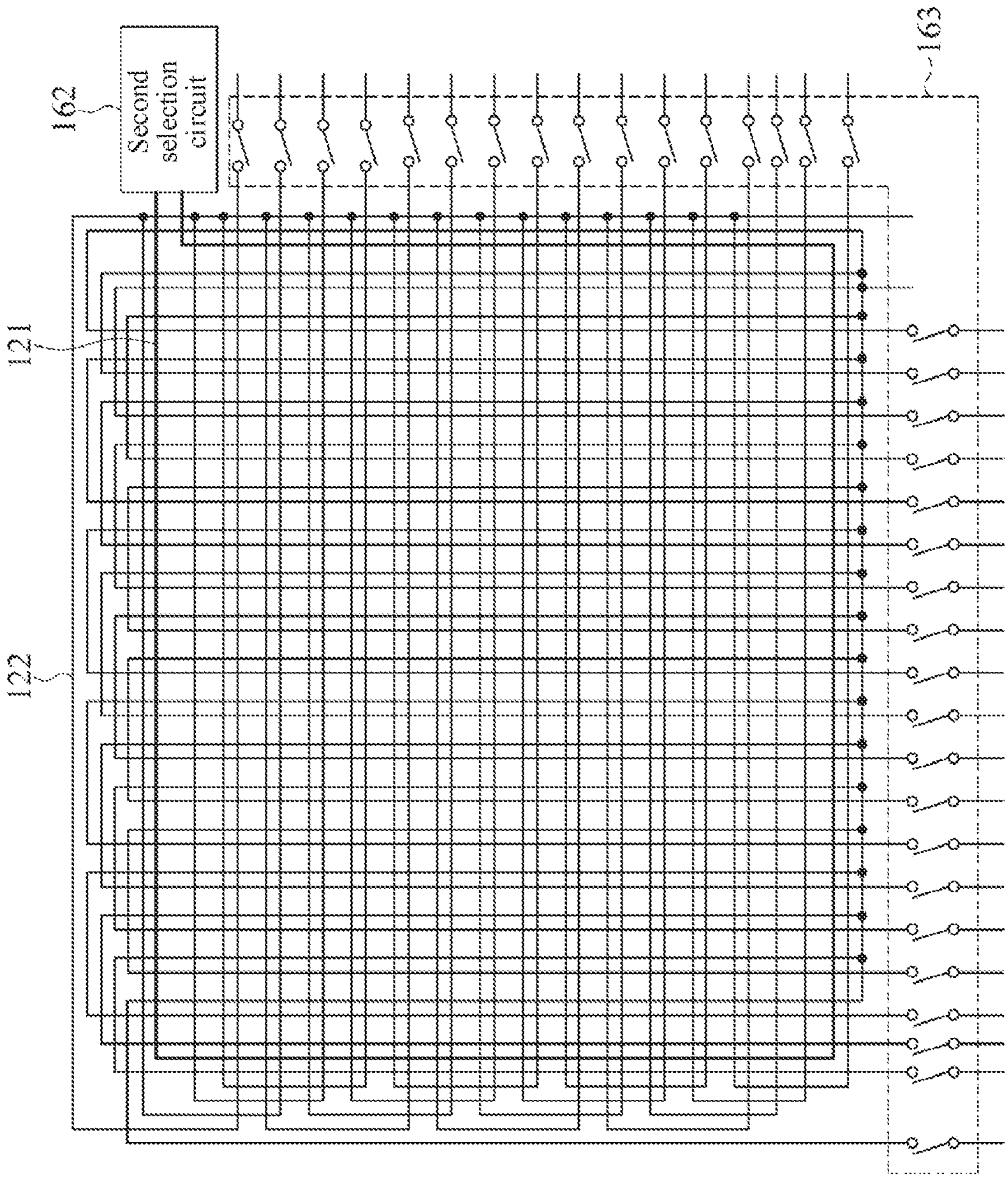
FIG. 8 is a circuit diagram of an embodiment of a first induction coil and a second induction coil of the electromagnetic induction type coordinate positioning apparatus of FIG. 3.

In some embodiments, referring to FIG. 8, FIG. 8 is a circuit diagram of an embodiment of a first induction coil 121 and the second induction coil 122 of the electromagnetic induction type coordinate positioning apparatus 1 of FIG. 3. The number of first induction coils 121 may be a second induction coil 122 including a plurality of subcoils arranged along a horizontal direction (for example, X axis) and a plurality of subcoils arranged along a vertical direction (for example, Y axis), and every two neighboring subcoils are arranged in a staggered manner. The first induction coil 121 covers the subcoils of the second induction coil 122, that is, a vertical projection of the first induction coil 121 on the second induction coil 122 intersects with each of the subcoils of the second induction coil 122 that are arranged in the horizontal direction and the vertical direction.

In addition, as shown in FIG. 8, the electromagnetic induction type coordinate positioning apparatus 1 may include a third selection circuit 163 electrically-coupled between the second induction coil 122 and the control circuit 14. The third selection circuit 163 includes a plurality of sub-switches, respectively electrically-coupled to a plurality of subcoils of the second induction coil 122. When the control circuit 14 is in the operating mode, the control circuit 14 controls the third selection circuit 163 to be switched on to electrically connect the second induction coil 122 to the control circuit 14, so that the second current signal S4 flows to the second induction coil 122 through the third selection circuit 163. When the control circuit 14 is in the sleep mode, the third selection circuit 163 is switched off to disconnect the second induction coil 122 from the control circuit 14.

In some embodiments, after the first current signal S1 flows through the first induction coil 121 (that is, when the control circuit 14 is in the sleep mode), the first induction coil 121 may generate an excitation magnetic field, so that the pointer device 2 is resonantly electrically-coupled to the excitation magnetic field to store power. According to the excitation magnetic field generated by the first induction coil 121, the pointer device 2 may store part of a target power amount. The target power amount is a capacity of the pointer device 2 when filled up with power. In other words, the pointer device 2 does not need to be filled up with power, as long as the amount of power stored in the pointer device 2 is sufficient to cause the first induction coil 121 to detect that the pointer device 2 is in proximity and generate the first induction signal S2. In some embodiments, after the control circuit 14 switches to the operating mode so that the second current signal S4 flows through the second induction coil 122, the second induction coil 122 may generate another excitation magnetic field, so that the pointer device 2 is resonantly electrically-coupled to the another excitation magnetic field to store power until the target power amount is reached. In other words, the pointer device 2 may perform bidirectional communication with the electromagnetic induction type coordinate positioning apparatus 1 according to the power that fills up the pointer device 2.

In some embodiments, when the control circuit 14 is in the sleep mode, a power consumed by the electromagnetic induction type coordinate positioning apparatus 1 may be lower than a power consumed when the control circuit 14 is in the operating mode. Therefore, when the control circuit 14 is in the sleep mode, the first current signal S1 flowing through the first induction coil 121 is at lower frequency, for example, 500 kHz, that is, the first current signal S1 is operated at lower first frequency value. When the control circuit 14 is in the operating mode, the second current signal S4 flowing through the second induction coil 122 is at higher frequency, for example, 1 MHz, that is, the second current signal S4 is operated at higher second frequency value. In other words, the first frequency value of the first current signal S1 is less than the second frequency value of the second current signal S4.

In some embodiments, as shown in FIG. 3, the electromagnetic induction type coordinate positioning apparatus 1 may include a signal processing circuit 19. The signal processing circuit 19 is electrically-coupled between the control circuit 14 and the second induction coil 122. When the control circuit 14 is in the operating mode, the signal processing circuit 19 may perform signal processing on a signal generated by the second induction coil 122. For example, the signal processing circuit 19 includes an amplifier and a filter, to perform signal processing procedures such as amplification and filtering. The signal processing circuit 19 then sends the processed signal to the control circuit 14.

In some embodiments, the user may start the electromagnetic induction type coordinate positioning apparatus 1. After being started, the electromagnetic induction type coordinate positioning apparatus 1 may be in the operating mode by default. That is, the control circuit 14 is in the operating mode by default. The control circuit 14 controls the second induction coil 122 to sense the pointer device 2. When the second induction coil 122 does not detect the pointer device 2, the control circuit 14 switches to the sleep mode, and the electromagnetic induction type coordinate positioning apparatus 1 uses the first induction coil 121 to sense the pointer device 2. When the first induction coil 121 detects that the pointer device 2 is in proximity, the control circuit 14 then switches from the sleep mode to the operating mode according to the interrupt signal S3. In some embodiments, after being started, the electromagnetic induction type coordinate positioning apparatus 1 may be in the sleep mode by default. That is, the control circuit 14 is in the sleep mode by default. The electromagnetic induction type coordinate positioning apparatus 1 uses the first induction coil 121 to detect whether the pointer device 2 is in proximity.

In some embodiments, the control circuit 14 may be a micro control unit (MCU), a central processing unit (CPU), an embedded controller (EC), or an application-specific integrated circuit (ASIC). The selection circuits 161, 162, and 163 may each be a multiplexer (MUX) or a switch.

Based on the above, the electromagnetic induction type coordinate positioning apparatus can automatically switch from the sleep mode to the operating mode when detecting that the pointer device is in proximity, In this way, the user does not need to press the power button of the electromagnetic induction type coordinate positioning apparatus to wake up the electromagnetic induction type coordinate positioning apparatus, thereby avoiding the case that the content written by the user on the electromagnetic induction type coordinate positioning apparatus in the sleep state by using the pointer device is not recorded, and providing better user experience. In addition, in the sleep mode, the electromagnetic induction type coordinate positioning apparatus may use a current signal operated at lower frequency to sense the pointer device, and the sensing time is adjustable, thereby saving power of the electromagnetic induction type coordinate positioning apparatus.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. An electromagnetic induction type coordinate positioning apparatus, operated with a pointer device, the apparatus comprising:

- a first induction coil, configured for a first current signal to flow through, and is configured to sense the pointer device when the electromagnetic induction type coordinate positioning apparatus is in a sleep mode, and generate a first induction signal when detecting the pointer device;
- a second induction coil, configured for a second current signal to flow through, and is configured to sense the pointer device when the electromagnetic induction type coordinate positioning apparatus is in an operating mode, and communicate with the pointer device;
- a trigger circuit, electrically-coupled to the first induction coil, and configured to receive the first induction signal, and send an interrupt signal according to the first induction signal; and
- a control circuit, electrically-coupled to the second induction coil and the trigger circuit, and configured to receive the interrupt signal in the sleep mode, wherein the control circuit exits from the sleep mode according to the interrupt signal and switches to the operating mode, and the control circuit in the operating mode controls the second control signal to flow through the second induction coil.

2. The electromagnetic induction type coordinate positioning apparatus according to claim 1, further comprising:

- a power management circuit, electrically-coupled to the trigger circuit, and configured to provide a power source; and
- a first selection circuit, electrically-coupled to the power management circuit, the trigger circuit, and the control circuit, configured to be switched on when the control circuit is in the sleep mode, to electrically connect the power management circuit and the trigger circuit to provide the power source to the trigger circuit; and configured to be switched off by the control circuit when the control circuit is in the operating mode, to stop providing the power source to the trigger circuit.

3. The electromagnetic induction type coordinate positioning apparatus according to claim 2, further comprising:

- an oscillating circuit, electrically-coupled between the first induction coil and the first selection circuit, and configured to generate the first current signal flowing through the first induction coil when the control circuit is in the sleep mode; and
- a second selection circuit, electrically-coupled to the first induction coil, the oscillating circuit, and the trigger circuit, and configured to electrically connect the oscillating circuit to the first induction coil when the control circuit is in the sleep mode, so that the first current signal flows from the oscillating circuit through the first induction coil, wherein after the first current signal flows through the first induction coil, the second selection circuit is switched to electrically connect the first induction coil to the trigger circuit, so that the first induction signal is transferred from the first induction coil to the trigger circuit through the second selection circuit.

4. The electromagnetic induction type coordinate positioning apparatus according to claim 3, further comprising:

a power generation circuit, electrically-coupled between the oscillating circuit and the first selection circuit, and configured to receive the power source from the first selection circuit when the first selection circuit is switched on, wherein the power generation circuit operates according to the power source to generate another power source for operation of the oscillating circuit, and generates a control signal for controlling the second selection circuit to electrically connect to the trigger circuit or the oscillating circuit.

5. The electromagnetic induction type coordinate positioning apparatus according to claim 1, wherein the second induction coil comprises a plurality of subcoils arranged along a horizontal direction and a plurality of subcoils arranged along a vertical direction, and a vertical projection of the first induction coil on the subcoils intersects with each of the subcoils.

6. The electromagnetic induction type coordinate positioning apparatus according to claim 1, wherein after the first current signal flows through the first induction coil, the first induction coil provides energy storage for the pointer device, so that the pointer device stores part of a target power amount.

7. The electromagnetic induction type coordinate positioning apparatus according to claim 6, wherein after the second current signal flows through the second induction coil, the second induction coil enables the pointer device to store power to the target power amount.

8. The electromagnetic induction type coordinate positioning apparatus according to claim 1, wherein the first current signal having a first frequency value flows through the first induction coil, the second current signal having a second frequency value flows through the second induction coil, and the first frequency value is less than the second frequency value.

9. The electromagnetic induction type coordinate positioning apparatus according to claim 1, further comprising:

a third selection circuit, electrically-coupled to the second induction coil and the control circuit, wherein when the control circuit is in the operating mode, the third selection circuit is controlled by the control circuit to electrically connect to the second induction coil, so that the second current signal flows through the second induction coil; and the third selection circuit is switched off when the control circuit is in the sleep mode.

10. The electromagnetic induction type coordinate positioning apparatus according to claim 1, after the electromagnetic induction type coordinate positioning apparatus is started, the control circuit is in the operating mode by default, the control circuit in the operating mode drives the second control signal to flow through the second induction coil, to sense the pointer device, and when the pointer device is not detected, the control circuit switches to the sleep mode and waits for the interrupt signal.

* * * * *